(12) United States Patent
Takahashi et al.

(10) Patent No.: US 7,719,146 B2
(45) Date of Patent: May 18, 2010

(54) POWER TOOL WITH YOKE ROTATION PREVENTION MEANS

(75) Inventors: Shigeru Takahashi, Hitachinaka (JP); Naoki Tadokoro, Hitachinaka (JP); Takuma Saito, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/621,296

(22) Filed: Jan. 9, 2007

(65) Prior Publication Data

US 2007/0182269 A1 Aug. 9, 2007

(30) Foreign Application Priority Data

Jan. 11, 2006 (JP) ............................ P2006-003413

(51) Int. Cl.
*H02K 7/14* (2006.01)
(52) U.S. Cl. ..................... 310/50; 310/62; 310/63; 310/58; 310/154.08; 310/40 MM
(58) Field of Classification Search ................ 310/50, 310/62, 63, 58, 154.08, 40 MM
See application file for complete search history.

(56) References Cited

U.S. PATENT DOCUMENTS

| | | | | |
|---|---|---|---|---|
| 2,546,846 A | * | 3/1951 | Atkin | 310/83 |
| 2,970,233 A | * | 1/1961 | Penney | 310/63 |
| 3,022,097 A | * | 2/1962 | Seniff et al. | 277/356 |
| 3,476,960 A | * | 11/1969 | Rees | 310/50 |
| 3,652,879 A | * | 3/1972 | Plunkett et al. | 310/50 |
| 5,315,193 A | * | 5/1994 | Kummer et al. | 310/50 |
| 6,543,549 B1 | * | 4/2003 | Riedl et al. | 173/216 |
| 6,625,892 B2 | * | 9/2003 | Takahashi et al. | 30/393 |
| 2002/0182020 A1 | * | 12/2002 | Oomori et al. | 408/124 |
| 2004/0061406 A1 | | 4/2004 | Yokota et al. | |
| 2004/0104636 A1 | * | 6/2004 | Ortt et al. | 310/154.08 |
| 2004/0263008 A1 | * | 12/2004 | Voigt et al. | 310/58 |
| 2005/0194164 A1 | * | 9/2005 | Saito et al. | 173/48 |
| 2005/0225183 A1 | * | 10/2005 | Braun et al. | 310/50 |
| 2005/0269884 A1 | * | 12/2005 | Teranishi et al. | 310/50 |

FOREIGN PATENT DOCUMENTS

| | | |
|---|---|---|
| JP | 2005-40880 | 2/2005 |
| JP | 2005230931 | 9/2005 |

* cited by examiner

*Primary Examiner*—Quyen Leung
*Assistant Examiner*—Alex W Mok
(74) *Attorney, Agent, or Firm*—McDermott Will & Emery LLP

(57) ABSTRACT

A power tool 1 includes a cylindrical-shaped yoke 31, magnets 32 provided in the interior of the yoke 31, an armature 41 disposed rotatably in the interior of the yoke 31, a cooling fan 7 rotatably secured to the armature 41, a fan guide 8 disposed on the periphery of the cooling fan 7, and a cylindrical-shaped housing 2 for storing the yoke 31 therein. The fan guide 8 is contacted with the axial-direction one end face of the yoke 31, and the fan guide 8 is engaged with the yoke 31 in the rotation direction thereof.

5 Claims, 8 Drawing Sheets

FIG. 11 PRIOR ART
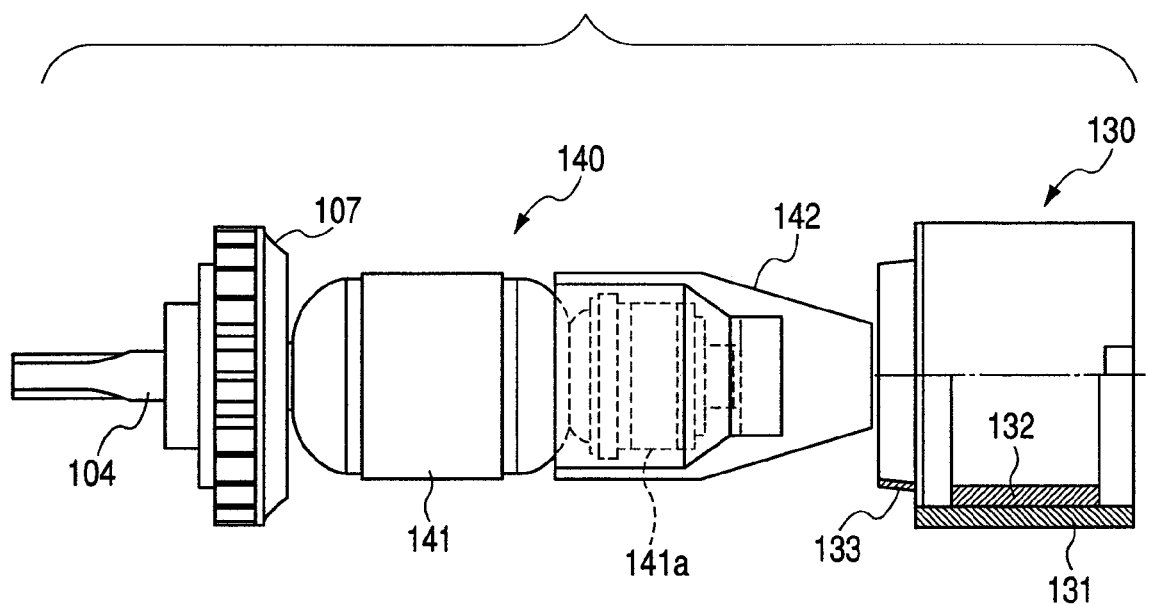
FIG. 12 PRIOR ART
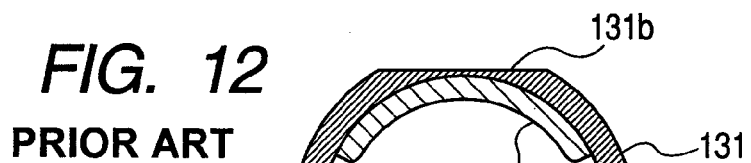
PRIOR ART
FIG. 13A
PRIOR ART
FIG. 13B
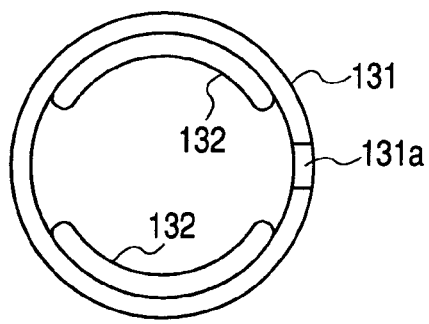
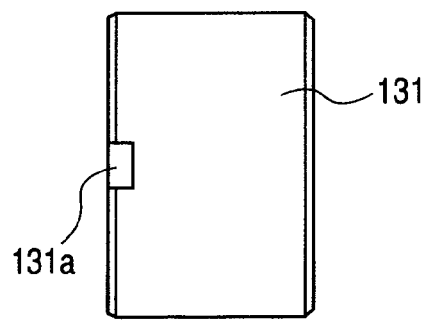

POWER TOOL WITH YOKE ROTATION PREVENTION MEANS

BACKGROUND OF THE INVENTION

1. Field of the Invention

The present invention relates to a power tool including a direct-current motor as its drive source such as a rotary hammer drill.

2. Description of Related Art

A power tool using a direct-current motor as its drive source has been widely put to practical use. A direct-current motor, which is used as the drive source of a power tool of this type, as shown in FIG. 10, is composed of a yoke set 130 and an armature set 140.

Here, the yoke set 130 is composed of a substantially cylindrical-shaped yoke 131 made of ferromagnetic material such as iron, two or more arc-curve-shaped magnets 132 disposed inside the yoke 131, and a ring-shaped dust guard 133 mounted on the yoke 131 in such a manner that it is fitted with the peripheral edge of the opening of the axial-direction one end portion of the yoke 131.

Also, the armature set 140 is composed of a rotation shaft 104 the two end portions of which are rotatably supported by bearings 105 and 106, and armature 141 and a cooling fan 107 which are both fixed to the rotation shaft 104. When the armature set 140 is rotatably inserted through the yoke set 130, a direct-current motor is assembled.

When incorporating the direct-current motor having the above structure into a two-split housing which is divided in two right and left parts, there is employed a method in which, after the yoke set 130 is stored into one of the two division parts of the housing, the armature set 140 is inserted into the yoke set 130; or, a method in which a direct-current motor composed of the yoke set 130 and armature set 140 previously assembled together is stored into one of the two division parts of the housing, the other division part of the housing is placed on one division part of the housing, and the two division parts are fastened together using a screw or the like, whereby the direct-current motor is incorporated into the housing.

By the way, when material having a weak magnetic force such as ferrite is used as the material of the magnet 132 fixed to the inner peripheral portion of the yoke 131 of the yoke set 130, no problem can occur in an operation for inserting the armature set 140 into the yoke set 130.

However, when material having a strong magnetic force such as a Neodybium-bond-system or rare-earth-system sintered alloy is used as the material of the magnet 132, since the armature 141 is attracted by the magnet 132 because of the strong magnetic force of the magnet 132 when inserting the armature set 140 into the yoke set 130, it is not easy to insert the armature 140 into the yoke set 130; and also, the armature 141, especially, the commutator 141a and winding portion 141b of the armature 141 can be damaged by the magnets 132 and dust guard 133 and thus, during use, there is a possibility that wires can be broken or there can occur a rare short.

In view of the above, as shown in FIG. 11, there is employed an assembling method in which, while a protection cap 142 made of non-magnetic material is left put on the commutator 141a of the armature 141, the armature set 140 is inserted through the inside of the yoke set 130 and, finally, the protection cap 142 is removed from the armature 141. According to this method, the protection cap 142 can prevent the armature 141 from being attracted to and damaged by the magnets 132.

On the other hand, since the two or more magnets 132 are fixed to the inner surface of the yoke 131, the yoke 131 receives the counter torque of the magnetic force for rotating the armature 141 and is thereby going to rotate. Also, as regards the magnets 132 fixed to the inner surface of the yoke 131, their angle positions with respect to a carbon brush are preset, which makes it necessary to position the yoke 131 and to prevent the yoke 131 against rotation.

Therefore, conventionally, there is employed such a positioning and rotation prevention structure as shown in FIG. 12 or 13.

Specifically, FIG. 12 is a transverse section view of the yoke 131. A structure shown in FIG. 12 is used to form width across flats 131b on the outer peripheral portion of the yoke 131 and bring the width across flats 131b into engagement with plane portions formed in a housing (not shown) to thereby attain the positioning and rotation prevention of the yoke 131.

Also, FIG. 13A is a front view of the yoke 131, and FIG. 13B is a side view of the yoke 131. A structure shown in FIG. 13 is used to form a rectangular-groove-shaped notch 131a in part of the axial-direction one end face of the yoke 131 and bring a projecting portion formed in a housing (not shown) into engagement with the notch 131a to thereby attain the positioning and rotation prevention of the yoke 131.

By the way, there has been proposed and already put to practical use a power tool in which, for the purpose of securing the high rigidity of a housing made of resin and for other purposes, the housing is formed in a cylindrical shape and a direct-current motor is incorporated in the barrel portion of the cylindrical-shaped housing (see Japanese Patent NO. 2005-40880).

However, when the assembling method using the protection cap 142 shown in FIG. 11 is applied to the cylindrical-shaped housing, since the yoke set 130 is previously incorporated in the barrel portion of the cylindrical-shaped housing, there arises a problem that, after the armature set 140 is inserted into the inside of the yoke set 130, the protection cap 142 cannot be removed. Therefore, when the armature set 140 is inserted into the yoke set 140, the armature 141 is attracted to the magnets 132, which gives rise to the above-mentioned various inconveniences.

Also, as regards the yoke 131 positioning and rotation preventing structure shown in FIGS. 12 and 13, because, before the yoke set 130 is incorporated into the cylindrical-shaped housing, the positioning and rotation prevention of the yoke 131 are not yet attained, the yoke set 130 must be fitted into the cylindrical-shaped housing while peeping into the inside of the cylindrical-shaped housing. Therefore, it is not easy to incorporate the yoke set 130 into the cylindrical-shaped housing, resulting in the poor efficiency of the assembling operation.

SUMMARY OF THE INVENTION

The invention aims at eliminating the above problems. Thus, it is an object of the invention to provide a power tool which can accomplish the positioning and rotation prevention of a yoke with high operation efficiency, and a method for assembling such power tool.

Also, it is another object of the invention to provide a power tool which can achieve the assembling of a direct-current motor into a cylindrical-shaped housing with high operation efficiency, and a method for assembling such power tool.

In attaining the above object, there is provided a power tool, comprising: a cylindrical-shaped yoke, magnets provided in the interior of the yoke, an armature disposed rotatably in the interior of the yoke, a cooling fan rotatably secured to the armature, a fan guide disposed on the periphery of the cooling fan, and a cylindrical-shaped housing for storing the yoke therein, wherein the fan guide is contacted with the axial-direction one end face of the yoke, and the fan guide is engaged with the yoke in the rotation direction thereof.

According to the invention in the axial-direction one end face of the yoke, there is formed a recessed portion and a projecting portion provided on the fan guide is fitted with the recessed portion.

According to the invention on the axial-direction other end side of the yoke, there is provided means for preventing the rotation of the yoke.

According to the invention on the yoke, there is mounted a dust guard projecting outward in the axial direction beyond the axial-direction other end face side of the yoke in such a manner that it is fitted with the yoke, and the rotation prevention means is composed of a first engaging portion formed in the dust guard and a second engaging portion formed in the cylindrical-shaped housing and engageable with the first engaging portion in the rotation direction.

According to the invention in the dust guard, there are provided integrally therewith two or more engaging projections which can be engaged with a peripheral-direction clearance formed between the magnets within the yoke.

According to the invention there is provided a method for assembling a power tool comprising a cylindrical-shaped yoke, magnets provided in the interior of the yoke, an armature disposed rotatably in the interior of the yoke, a cooling fan rotatably secured to the armature, a fan guide disposed on the periphery of the cooling fan, and a cylindrical-shaped housing for storing the yoke therein, wherein the one end portion of an armature set composed of the armature and the cooling fan mounted on the rotation shaft thereof is covered with a protection cap made of nonmagnetic material, the armature set, with the protection cap side at the head thereof, is inserted into the inside of the yoke set including the yoke and the magnets to thereby assemble a motor assembly, the protection cap is thereafter removed from the motor assembly, and the motor assembly is then pushed into the cylindrical-shaped housing to thereby assemble the motor assembly into the cylindrical-shaped housing.

According to the invention the fan guide is structured such that the end face thereof can be contacted with the end face of the yoke existing on the rear side in the insertion direction, and the motor assembly is pushed into the cylindrical-shaped cylinder through the fan guide.

According to the invention wherein the fan guide is engaged with the yoke in the rotation direction.

According to the invention while preventing the rotation of the yoke by rotation prevention means provided on the axial-direction other end side of the yoke, the motor assembly is pushed into the cylindrical-shaped housing.

According to the invention on the yoke, there is mounted a dust guard projecting outward in the axial direction beyond the axial-direction other end face side of the yoke in such a manner that it is fitted with the yoke, and the rotation prevention means is composed of a first engaging portion formed in the dust guard and a second engaging portion formed in the cylindrical-shaped housing and engageable with the first engaging portion in the rotation direction, and, with the first and second engaging portions engaged with each other, the motor assembly is pushed into the cylindrical-shaped housing.

According to the invention wherein, in the dust guard, there are provided integrally therewith two or more engaging projections which can be engaged with peripheral-direction clearances respectively formed between the magnets within the yoke.

According to the invention since the fan guide is contacted with the axial-direction one end face of the yoke and these two parts are engaged with each other in the rotation direction, the positioning and rotation prevention of the yoke can be attained positively and the angle positions of the magnets mounted on the inner surface of the yoke can be determined with high accuracy.

According to the invention because the recessed portion is formed in the axial-direction one end face of the yoke, the working of the yoke made of metal can be facilitated and thus the cost thereof can be reduced.

According to the invention the yoke rotation prevention means is provided on the axial-direction other end side of the yoke and, according to the invention the rotation prevention means is composed of the first engaging portion formed in the dust guard and the second engaging portion formed in the cylindrical-shaped housing. With this construction, the positioning and rotation prevention of the yoke can be positively achieved by the rotation prevention means as well.

According to the inventions because of employment of the structure in which the engaging projection provided integrally in the dust guard is engaged with the peripheral-direction clearance formed between the magnets within the yoke, the peripheral-direction rotation prevention of the dust guard can be accomplished by the magnets, and the positioning and rotation prevention of the yoke with respect to the cylindrical-shaped housing by the first engaging portion formed in the dust guard and the second engaging portion formed in the cylindrical-shaped housing can be attained further positively. Also, the axial-direction shifting and peripheral-direction rotation of the magnets can be prevented by the dust guard; and, because the engaging projection is provided integrally on the dust guard, the number of parts can be reduced, the assembling efficiency of the power tool can be enhanced, and the cost of the power tool can be reduced.

According to the invention in assembling a power tool, the one end portion of the armature set is covered with the protection cap made of nonmagnetic material, and the armature set, with the protection cap side thereof at the head thereof, is inserted into the inside of the yoke set to thereby assemble the motor assembly. With this construction, the magnetic forces of the magnets can be cut off by the protection cap and, without the armature being attracted by the magnets, the armature set can be easily inserted through the inside of the yoke set with high operation efficiency. Therefore, not only the positioning and rotation prevention of the yoke of the motor assembly can be achieved positively with high operation efficiency but also the motor assembly can easily be pushed into and assembled to the cylindrical-shaped housing with high operation efficiency. By the way, the protection cap can be removed easily before the motor assembly is incorporated into the cylindrical-shaped housing.

According to the invention the fan guide is structured such that the end face thereof can be contacted with the insertion-direction rear side end face of the yoke and, in assembling the present power tool, the motor assembly is pushed through the fan guide into the cylindrical-shaped housing. And, according to the invention the fan guide is engaged with the yoke in the rotation direction. With this construction, when the fan guide is fitted into the cylindrical-shaped housing and the cylindrical-shaped housing is thereby prevented against rotation, the positioning and rotation prevention of the yoke to be engaged with the cylindrical-shaped housing can be positively attained by the fan guide.

According to the invention while preventing the rotation of the yoke by the rotation prevention means provided on the axial-direction other end side of the yoke, the motor assembly is pushed into the cylindrical-shaped housing. And, according to the invention the rotation prevention means is composed of the first engaging portion formed in the dust guard and the second engaging portion formed in the cylindrical-shaped housing, and, with the first and second engaging portions engaged with each other, the motor assembly is pushed into the cylindrical-shaped housing. With this construction, the motor assembly can be easily assembled into the cylindrical-shaped housing with high operation efficiency while attaining the positioning and rotation prevention of the yoke by the rotation prevention means as well.

BRIEF DESCRIPTION OF THE DRAWINGS

FIG. 11 is a partially broken side view of a conventional power tool, showing how an armature is assembled into a yoke set;

FIG. 12 is a transverse section view of a yoke employed in the conventional power tool, showing a structure for attaining the positioning and rotation prevention of the yoke;

FIG. 13A is a front view of the yoke in the conventional power tool, showing a structure for attaining the positioning and rotation prevention of the yoke; and FIG. 13B is a side view of the yoke.

DETAILED DESCRIPTION OF THE PREFERRED EMBODIMENTS

Now, description will be given below of an embodiment according to the invention with reference to the accompanying drawings.

Firstly, description will be given below of the structure of a power tool according to the invention with reference to FIG. 1.

Figure 1:
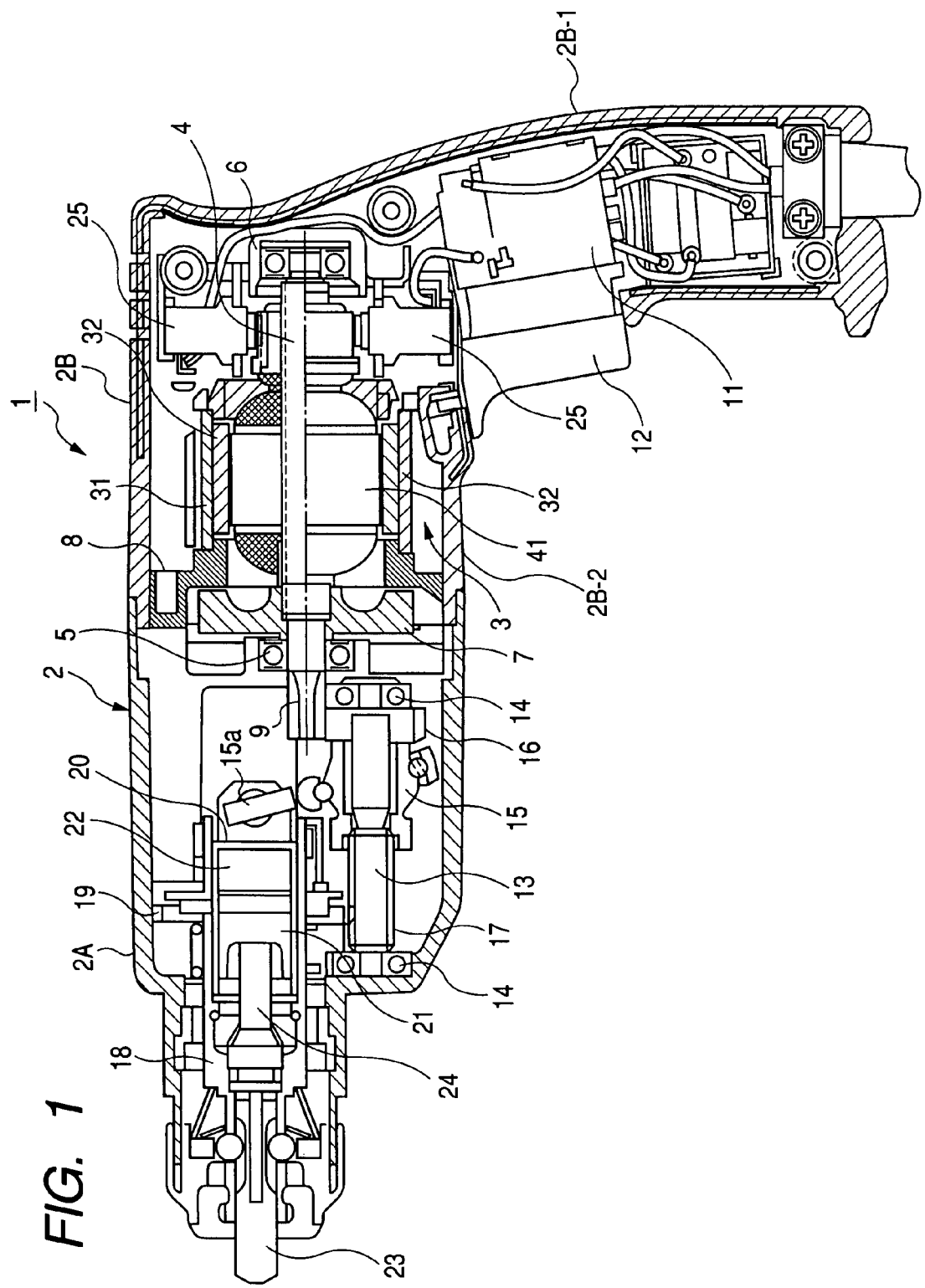
FIG. 1 is a longitudinal section view of a power tool (a rotary hammer drill) according to the invention.

FIG. 1 is a longitudinal section view of a rotary hammer drill 1 as an embodiment of a power tool according to the invention. The rotary hammer drill 1 shown in FIG. 1 incorporates a direct-current motor 3 functioning as a drive source within a resin-made cylindrical-shaped housing 2 functioning as an outer frame member, while the rotation shaft (motor shaft) 4 of the direct-current motor 3 is rotatably supported at the two ends thereof by bearings 5 and 6. And, to the rotation shaft 4, there is secured a cooling fan 7 and, in the periphery of the cooling fan 7, there is disposed a fan guide 8 used to form an air passage. Further, on the front end portion of the rotation shaft 4 that projects forwardly from the bearing 5, there is formed a pinion 9.

Also, the cylindrical-shaped housing 2 is structured by connecting and unifying together its two front and rear division parts 2A and 2B, while, to the handle portion 2B-1 of the rear division part 2B, there is connected a power cord 10 which is used to supply power to the direct-current motor 3. And, on the handle portion 2B-1 of the division part 2B, there are disposed a circuit (AC/DC converter) 11 for converting alternating-current power to direct-current power, and a switch 12 for turning on/off the supply of the power to the direct-current motor 3.

In front of the direct-current motor 3 within the cylindrical-shaped housing 2, there is disposed an intermediate shaft 13 in parallel to the rotation shaft 4, while the intermediate shaft 13 is rotatably supported at its two ends by bearings 14. And, on the intermediate shaft 13, there are disposed a reciprocating bearing 15 and gears 16, 17 and, with the gear 16, there is meshingly engaged the pinion 9 formed in the front end portion of the rotation shaft 4. Here, the diameter of the gear 16 is set larger than the diameter of the pinion 9, while the gear 16 constitutes a reduction mechanism.

Also, within the front end portion of the cylindrical-shaped housing 2, there is disposed a cylinder 18 in such a manner that it extends parallel to the rotation shaft 4 and intermediate shaft 13 and can be rotated. On the outer peripheral portion of the cylinder 18, there is disposed a gear 19; and, the gear 19 is meshingly engaged with the gear 17 provided on the intermediate shaft 13. The diameter of the gear 19 is set larger than the diameter of the gear 17, while theses gears 17 and 19 constitute the reduction mechanism.

Into the cylinder 18, there is fitted and inserted a bottomed cylindrical-shaped piston 20 having one end (front end) opened in such a manner that it can be slid back and forth and, within the piston 20, there is formed a pressure chamber 22 which is separated by an intermediate member 21. And, to the rear end portion of the piston 20, there is connected the arm 15a of the reciprocating bearing 15 and, on the leading end portion of the cylinder 18, there is removably mounted a leading tool (drill bit) 23. The leading tool 23 can be slid back and forthwith respect to the cylinder 18 and can be rotated integrally with the cylinder 18; and, between the leading tool 23 and intermediate member 21, there is interposed a driving member 24.

Thus, when the switch 12 is turned on to drive the direct-current motor 3, the rotation of the rotation shaft 4 of the direct-current motor 3 is reduced and transmitted through the pinion 9 and gear 16 to the intermediate shaft 13, whereby the intermediate shaft 13 is driven and rotated at a given speed. In response to this, the arm 15a of the reciprocating bearing 15 is oscillated back and forth to allow the piston 20 to reciprocate back and forth within the cylinder 18. As a result of this, the internal pressure of the pressure chamber 22 within the cylinder 18 is caused to vary, and an impact caused by the variation in the internal pressure is transmitted through the intermediate member 21 and driving member 24 to the leading tool 23, that is, a driving force is applied to the leading tool 23.

Also, the rotation of the intermediate shaft 13 is reduced and transmitted through the gears 17 and 19 to the cylinder 18, so that the cylinder 18 and the leading tool 23 mounted on the cylinder 18 are driven and rotated.

Thus, the rotation and driving force are applied to the leading tool 23 in the above-mentioned manner, and an operation to drill a hole in a work (not shown) is carried out by the leading tool 23. By the way, although not shown, in the rotary hammer drill 1 according to the present embodiment, there is provided a mode switching mechanism, whereby it is possible to select a rotation mode for applying only the rotation to the leading tool 23 or a rotation/driving mode for applying the rotation and driving force in the above-mentioned manner.

Next, description will be given below of the subject matter of the invention with reference to FIGS. 2 to 5.

Figure 2A:
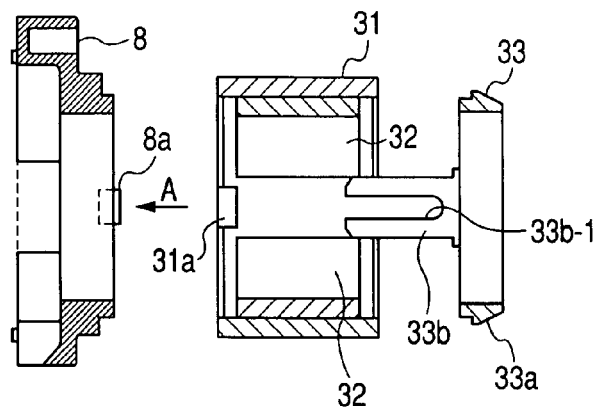
FIG. 2A is an exploded side section view of a yoke set employed in the power tool according to the invention.
Figure 2B:
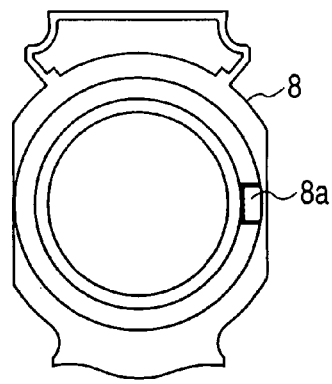
FIG. 2B is a front view (a view taken along the arrow mark A shown in FIG. 2A) of a fan guide.
Figure 3:
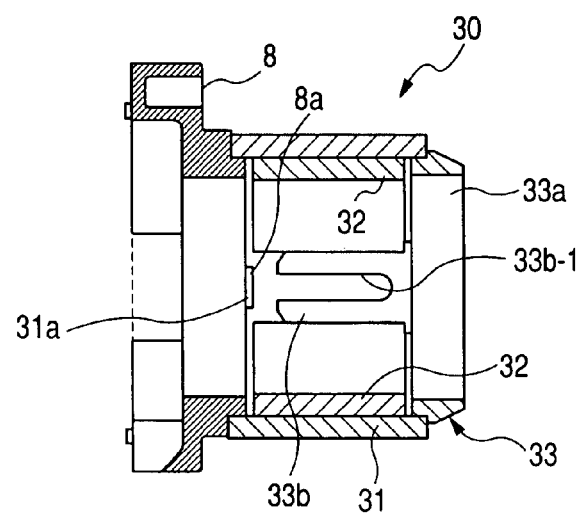
FIG. 3 is a side section view of the yoke set of the power tool according to the invention.
Figure 4:
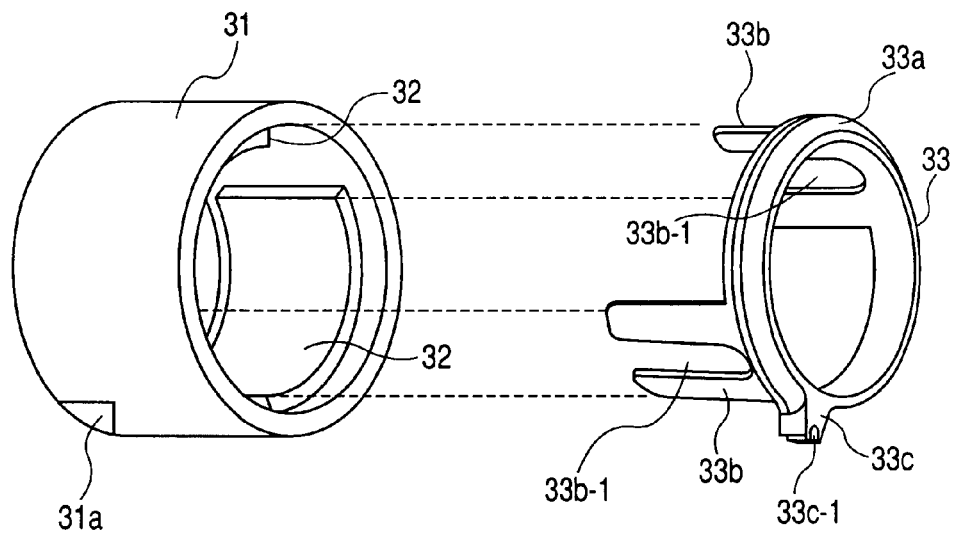
FIG. 4 is an exploded perspective view of the yoke set of the power tool according to the invention.
Figure 5:
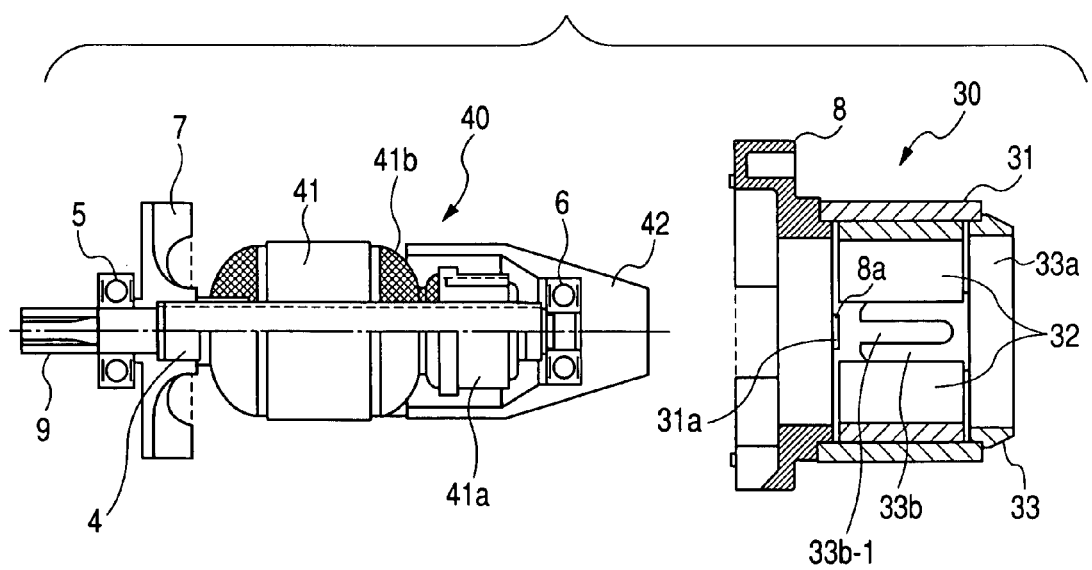
FIG. 5 is a side section view of an armature set and a yoke set in the power tool according to the invention, showing how the armature set is assembled into the yoke set.

FIG. 2A is an exploded side section view of a yoke set, FIG. 2B is a front view (view taken along the arrow mark A direction shown in FIG. 2A) of a fan guide, FIG. 3 is a side section view of a yoke set, FIG. 4 is an exploded perspective view of a yoke set, and FIG. 5 is a side section view of an armature set and a yoke set, showing how to assemble the armature set to the yoke set.

The above-mentioned direct-current motor 3, which functions as the drive source of the present power tool, is structured such that an armature set (rotor) 40 shown in FIG. 5 is rotatably stored in a substantially cylindrical-shaped yoke set (stator) 30 shown in FIG. 3. Here, the yoke set 30, as shown in FIGS. 2 and 3, is composed of a substantially cylindrical-shaped yoke 31 made of ferromagnetic material such as iron, two arc-curved-shaped magnets 32 disposed inside the yoke 31, the above-mentioned fan guide 8 mounted on the axial-direction one end (front end) of the yoke 31, and a dust guard 33 mounted on the axial-direction other end (rear end) of the yoke 31. Here, between the two magnets 32 within the yoke 31, there are formed peripheral-direction clearances which are arranged at regular intervals.

The fan guide 8, as shown in FIG. 2A, has an outer shape following the inner peripheral shape of the barrel portion 2B-2 of the division part 2B of the cylindrical-shaped housing 2 and, when the fan guide 8 is incorporated into the barrel portion 2B-2 of the division part 2B, the outer portion of the fan guide 8 is fitted with the inner peripheral portion of the barrel portion 2B-2, whereby the fan guide 8 is prevented against rotation. Also, the fan guide 8, as shown in FIG. 3, is mounted onto the yoke 31 in such a manner that the end face of the fan guide 8 can be contacted with the axial-direction one end face of the yoke 31. And, on a portion of the surface of the fan guide 8 that can be contacted with the axial-direction one end face of the yoke 31, as shown in FIG. 2, there is provided a projecting portion 8a integrally with such portion.

On the other hand, in a portion of the axial-direction one end face (the surface with which the end face of the fan guide 8 can be contacted) of the yoke 31, there is formed a rectangular-groove-shaped recessed portion 31a and, with the recessed portion 31a, there is fitted the above-mentioned projecting portion 8a that is projectingly provided on the fan guide 8. From the viewpoint of the fit relationship between the projecting and recessed portions, a recessed portion may also be formed in the fan guide 8 and a projecting portion may also be provided on the yoke 31. However, as in the present embodiment, when the recessed portion 31a is formed in the metal-made yoke 31, the working of the yoke 31 can be facilitated and thus the cost of the yoke 32 can be reduced.

Also, the dust guard 33 is formed of resin as a unified body and, as shown in FIG. 3, it is fitted with the inner periphery of the rear end portion (in FIG. 3, the right end portion) of the yoke 31. And, on the dust guard 33, there are integrally provided two engaging projections 33b which project perpendicularly from the ring-shaped main body portion 33a of the dust guard 33 (see FIG. 4); and, the main body portion 33a projects rearward (in FIG. 3, in the rightward direction) by a given amount from the axial-direction one end of the yoke 31 and fulfills a function to prevent dust such as iron dust from entering the inside of the yoke 31.

Further, two engaging projections 33b, which respectively project from the main body portion 33a of the dust guard 33 integrally therewith, as shown in FIG. 4, are formed at positions 180° distant from each other in the peripheral direction such that they face each other; and, the outer peripheral surfaces of the engaging projections 33b are formed in an arc-curved surface such that they can be closely contacted with the inner peripheral surface of the yoke 31. And, in the width-direction central portions of the respective engaging projections 33b, there are formed slits 33b-1 which extend in the axial direction of the dust guard 33.

Also, as shown in FIG. 4, on a portion (side portion) of the outer periphery of the dust guard 33, there is integrally provided a projecting portion 33c which projects outwardly in the diameter direction of the dust guard 33 and, in the projecting portion 33c, there is formed an engaging recessed portion 33c-1 in such a manner that it penetrates through the projecting portion 33c in the axial direction of the dust guard 33.

Thus, to mount the dust guard 33 onto the yoke 31, the dust guard 33 may be aligned with the yoke 31 in such a manner that the engaging projections 33b thereof can be engaged with the peripheral-direction clearances between the magnets 31, may be pushed into the front portion of the yoke 31, and the outer periphery of the main body portion 33a may be fitted with the inner periphery of the rear end portion of the yoke 31. Thus, as shown in FIG. 3, the two engaging projections 33b of the dust guard 33 are engaged with the two peripheral-direction clearances respectively formed between the two magnets 32 of the yoke 31 to position the respective magnets 32 in the peripheral direction, thereby preventing the magnets 32 from rotating along the inner peripheral surface of the yoke 31. Also, at the same time, the two magnets 32 prevent the dust guard 33 against rotation in the peripheral direction.

Here, the width dimension of the respective engaging projections 33b of the dust guard 33 is set slightly larger (to such an extent that can secure a given pressure insertion margin) than the peripheral-direction length of the peripheral-direction clearances formed between the two magnets 32. When bringing these engaging projections 33b into engagement with the peripheral-direction clearances interposed between the two magnets 32, the engaging projections 33b are respectively compressed and deformed in the width direction and the reacting forces (elastic forces) thereof are applied onto the peripheral-direction end faces of the two magnets 32, with the result that the two magnets 32 are energized outwardly in the diameter direction and are thereby closely contacted with the inner peripheral surface of the yoke 31. Therefore, even when the adhesive force of the respective magnets 32 with respect to the inner peripheral surface of the yoke 31 is weakened, the magnets 32 can be prevented from slipping away from the yoke 31 in the axial direction of the yoke 31, that is, prevention of removal of the magnets 32 can be accomplished effectively. Also, since the respective outer peripheral surfaces of the magnets 32 and the respective outer peripheral surfaces of the engaging projections 33b of the dust guard 33 are formed in an arc-curved surface following the inner peripheral surface of the yoke 31 and the respective outer peripheral surfaces are closely contacted with the inner peripheral surface of the yoke 31, even when the adhesive force of the magnets 32 with respect to the inner peripheral surface of the yoke 31 is weakened, the magnets 32 are prevented from being removed in the diameter direction of the yoke 31.

Further, according to the present embodiment, because, in the respective engaging projections 33b of the dust guard 33, there are formed the slits 33b-1 which extend in the axial direction of the dust guard 33, when fitting the dust guard 33 with the yoke 31 while inserting the engaging projections 33b into between the two magnets 32, the assembling efficiency of the dust guard 33 will not be impaired, and the engaging projections 33b can be easily engaged with the peripheral-direction clearances interposed between the magnets 32, thereby being able to attain the positive removal prevention of the magnets 32. Also, since the reacting force of the engaging projections 33b of the dust guard 33 to press the peripheral-direction end faces of the magnets 32 increases, the axial-direction removal of the magnets 32 can be prevented. Further, because the section area of the air passage, which is formed between the armature 41 and yoke 31 by the yoke 31 and the peripheral-direction clearances formed between the magnets 32, increases by an amount corresponding to the slits 33b-1, the flow rate of the cooling air passing through the air passage also increases, which makes it possible to enhance the cooling efficiency of the direct-current motor 3.

When the direct-current motor 3 shown in FIG. 1 is driven, the cooling fan 7 is rotated together with the rotation shaft 4 of the motor 3, the cooling air generated by the cooling fan 7 is introduced along the fan guide 8 into the direct-current motor 3, and the cooling air passes through the direct-current motor 3 in the axial direction, thereby cooling the direct-current motor 3.

Thus, according to the present embodiment, since the engaging projections 33b of the dust guard 33 are formed in an arc-curved surface so that they can be closely contacted with the inner peripheral surface of the yoke 31 and also since, in the width-direction central portions of the engaging projections 33b, there are formed the slits 33b-1, a reduction in the section area of the air passage formed between the armature 41 and yoke 31 by the yoke 31 and the peripheral-direction clearances respectively formed between the magnets 32 can be minimized. As a result of this, a reduction in the flow amount of the cooling air passing through the air passage can also be minimized and a reduction in the cooling efficiency of the direct-current motor 3 can be controlled to a low level.

On the other hand, the armature set 40, as shown in FIG. 5, is composed of the above-mentioned rotation shaft 4, the above-mentioned bearings 5, 6 for supporting the two ends of the rotation shaft 4, and, the armature 41 and cooling fan 7 both of which are mounted on the rotation shaft 4.

Next, description will be given below of a method for assembling the above-mentioned direct-current motor 3, which is composed of the yoke set 30 and armature 40, into the cylindrical-shaped housing 2 (specifically, the barrel portion 2B-2 of the division part 2B) with reference to FIGS. 5 to 9.

Figure 8:
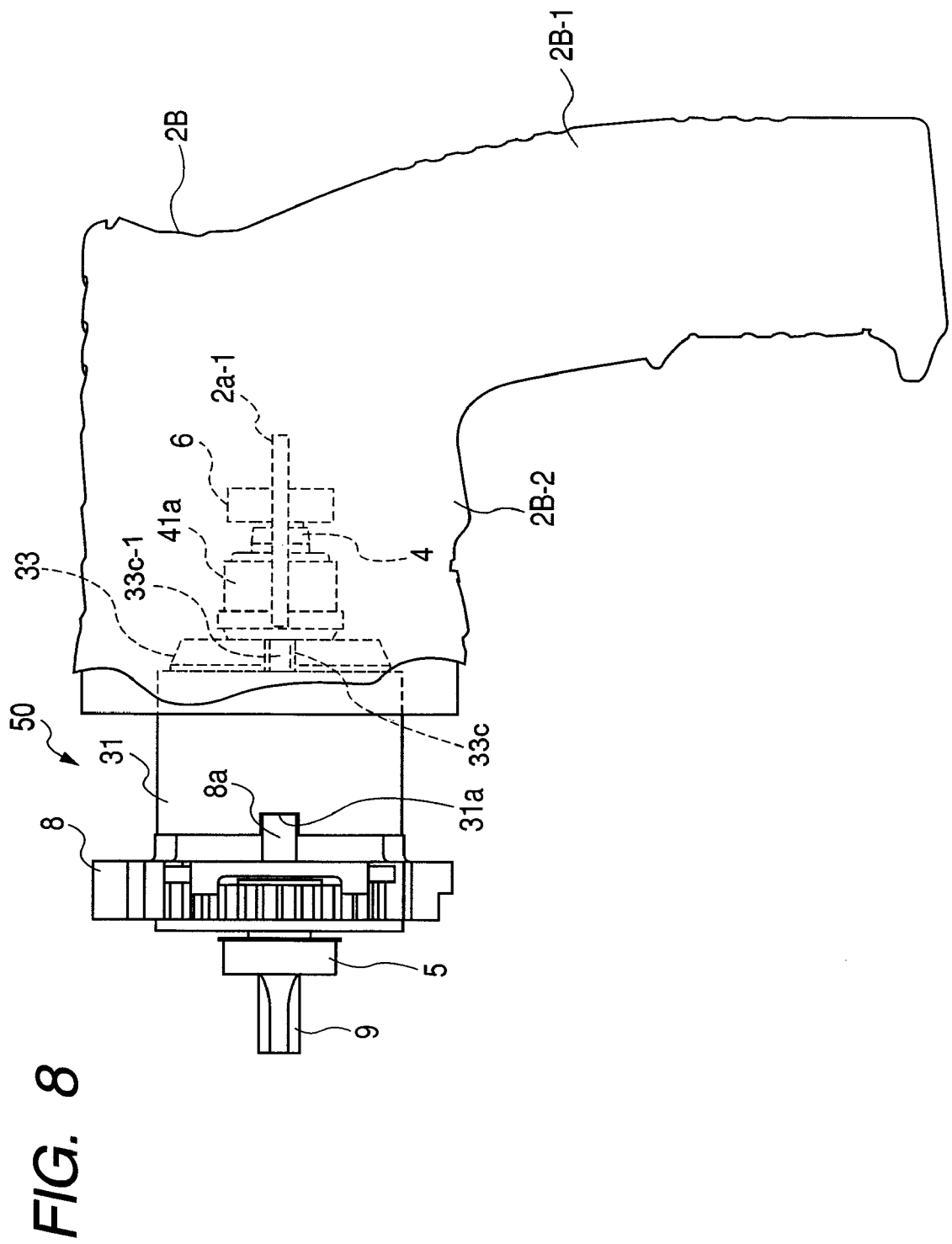
FIG. 8 is a side view of the motor assembly and cylindrical-shaped housing in the power tool according to the invention, showing how the motor assembly is assembled into the cylindrical-shaped housing.
Figure 9:
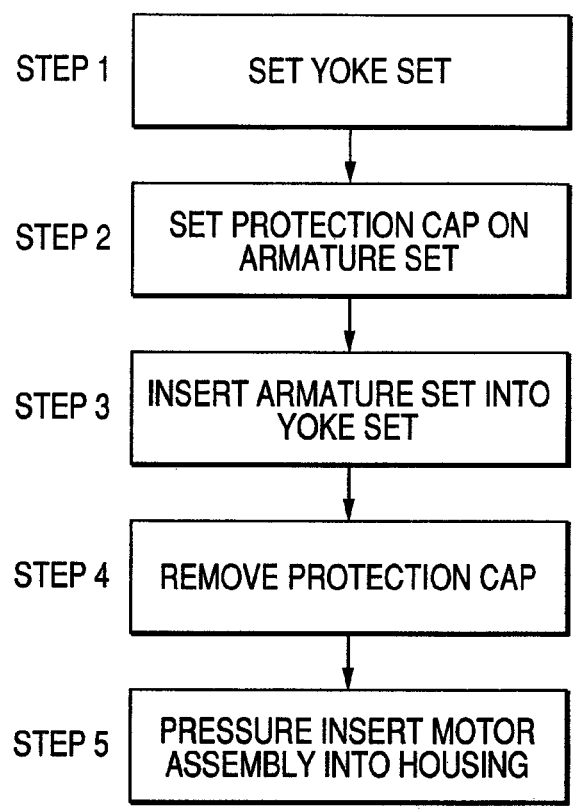
FIG. 9 is a flow chart of the procedure of a power tool assembling method according to the invention.
Figure 10:
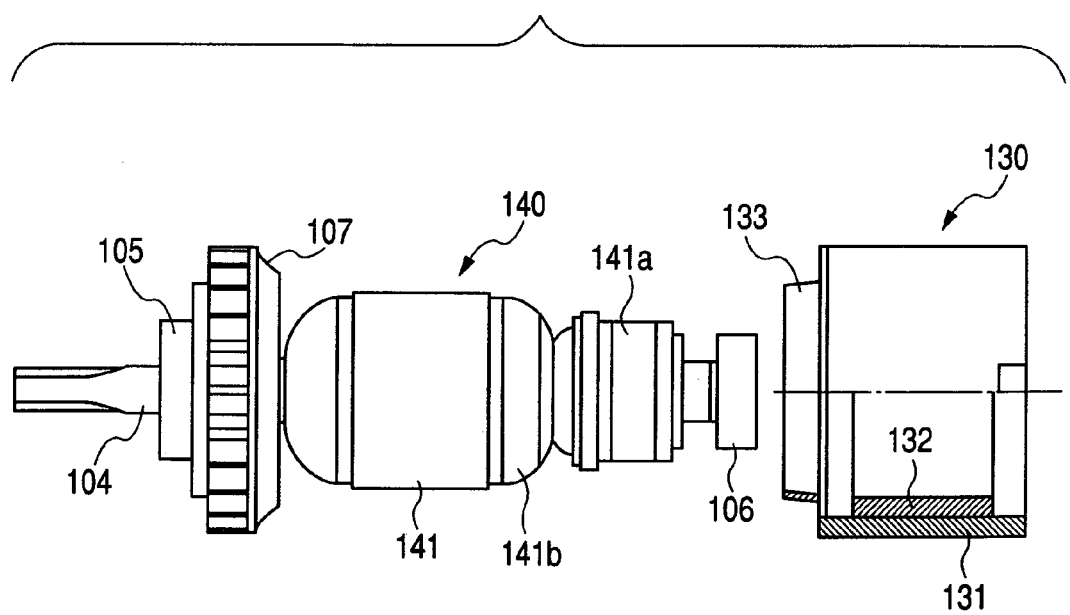
FIG. 10 is a partially broken side view of a conventional power tool, showing how an armature is assembled into a yoke set.

FIG. 8 is a side section view (or a side view) of a motor assembly 50 and the division part 2B of the cylindrical-shaped housing 2, showing the assembling method according to the invention in the order of assembling steps, FIG. 9 is a flow chart of the assembling procedure of the assembling method.

To assemble the direct-current motor 3 into the cylindrical-shaped housing 2 (the barrel portion of the division part 2B), as shown in FIG. 5, the yoke set 30 is set (in FIG. 9, STEP 1), and a bottomed cylindrical-shaped cap 42 made of nonmagnetic material such as resin is placed on the leading end portion of the armature set 40 (the commutator 41a portion of the armature 41) (in FIG. 9, STEP 2). Here, the protection cap 42 is formed in a tapered shape the diameter of the outer peripheral portion of which reduces toward the leading end thereof and, when the inner peripheral portion of the protection cap 42 is fitted with the outer peripheral portion of the bearing 6, the protection cap 42 can be easily mounted onto the armature set 40 by one touch.

Next, in a state shown in FIG. 5, with the protection cap 42 set at the head thereof, the armature set 40 is inserted into and assembled to the yoke set 30 (in FIG. 9, STEP 3). When, in a state where a portion (the commutator 41a portion) of the armature 41 is covered with the protection cap 42 made of nonmagnetic material, the armature set 40 is inserted into the yoke set 30, since the magnetic forces of the magnets 32 of the yoke set 30 are cut off by the protection cap 42, the armature 41 is prevented from being attracted to the magnets 32 and thus the armature set 40 can be easily inserted into the yoke set 30 with high operation efficiency. Therefore, even when the magnets 32 are made of material having a strong magnetic force such as a Neodymium-bond-system or rare-earth-system sintered alloy, the armature 41 is not attracted by the magnets 32, which can prevent the winding portion 41b and commutator 41a portion of the armature 41 from touching the fan guide 8 and thus from being damaged. Therefore, when the power tool is in use, the breakage of the windings and the occurrence of rate shorts can be prevented.

Figure 6:
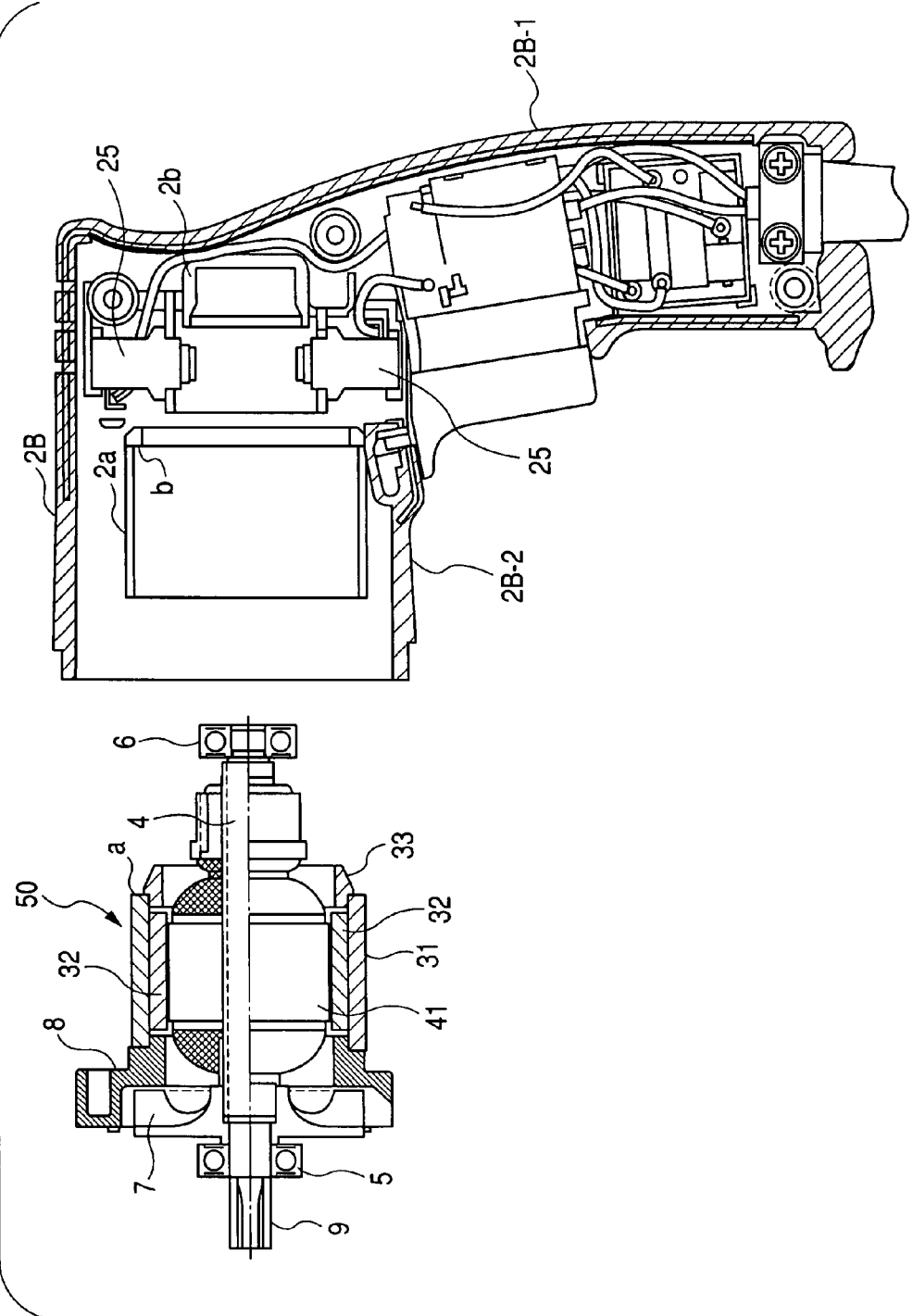
FIG. 6 is a side section view of a motor assembly and a cylindrical-shaped housing in the power tool according to the invention, showing how the motor assembly is assembled into the cylindrical-shaped housing.
Figure 7:
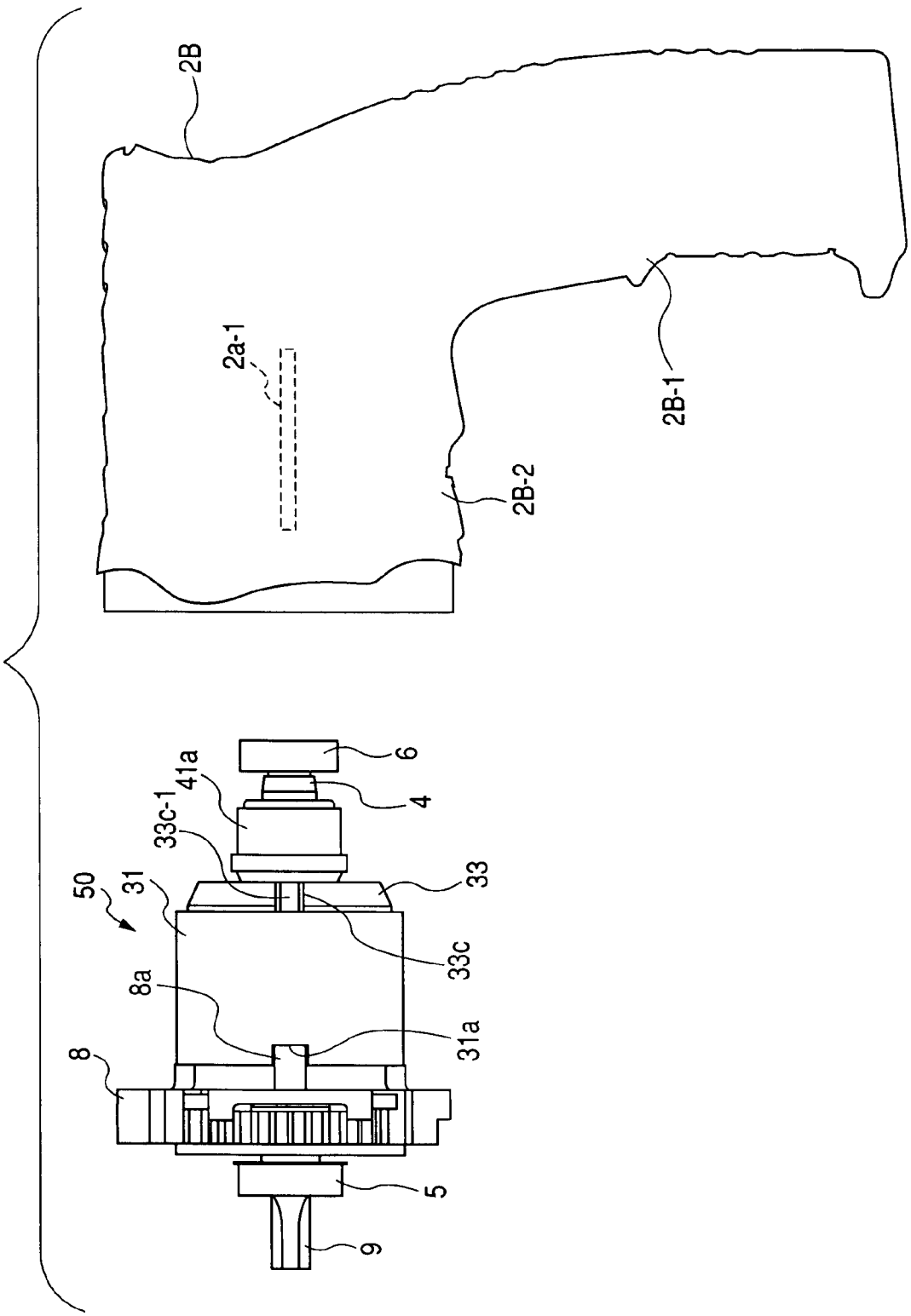
FIG. 7 is a side view of the motor assembly and cylindrical-shaped housing in the power tool according to the invention, showing how the motor assembly is assembled into the cylindrical-shaped housing.

After the armature set 40 is inserted through the inside of the yoke set 30 in the above-mentioned manner, when the protection cap 42 is removed from the armature set 40 (in FIGS. 9, STEP 4), as shown in FIGS. 6 and 7, there is obtained a motor assembly 50 in which the armature set 40 and yoke set 30 are assembled and unified integrally; and, when the motor assembly 50 is pushed into the barrel portion 2B-2 of the division part 2B of the cylindrical-shaped housing 2 with the bearing 6 at the head thereof as shown in FIGS. 6 and 7, the motor assembly 50 can be pressure inserted into and assembled to the barrel portion 2B-2 of the division part 2B (in FIG. 9, STEP 5). The protection cap 42 can be easily removed outside the division part 2B before the motor assembly 50 is assembled to the division part 2B of the cylindrical-shaped housing 2.

Here, as described above, on the portion (side portion) of the outer periphery of the dust guard 33 of the motor assembly 50, there is provided integrally therewith the projecting portion 33c which projects outward in the diameter direction of the dust guard 33; and, in this projecting portion 33c, there is formed the engaging recessed portion 33c-1 in such a manner that it penetrates through the projecting portion 33c in the axial direction of the dust guard 33 (see FIGS. 4 and 7).

On the other hand, within the barrel portion 2B-2 of the division part 2B of the cylindrical-shaped housing 2, as shown in FIG. 6, there are provided a cylindrical-shaped fit hold portion 2a and a bearing receiving portion 2b in such a manner that they are spaced apart from each other in the axial direction of the housing 2 and are integral with the barrel portion 2B-2. On the portion (side portion) of the inner peripheral portion of the fit hold portion 2a, as shown in FIG. 7, there is provided a rail-shaped engaging projecting portion 2a-1 which extends horizontally in the axial direction of the housing 2.

According to this structure, when assembling the motor assembly 50 into the barrel portion 2B-2 of the division part 2B of the cylindrical-shaped housing 2 in the above-mentioned manner, firstly, the engaging projecting portion 2a-1 provided on the fit hold portion 2a of the division part 2B may be engaged with the engaging recessed portion 33c-1 formed in the dust guard 33 in such a manner as shown in FIG. 8. According to this manner, without peeping into the inside of the barrel portion 2B-2, an operation for bringing the motor assembly 50 into fit with the barrel portion 2B-2 can be carried out easily.

In a state where the engaging projecting portion 2a-1 provided on the fit hold portion 2a of the division part 2B is engaged with the engaging recessed portion 33c-1 formed in the dust guard 33, when the fan guide 8 existing in the rear end portion of the motor assembly 50 is pushed forward, the motor assembly 50 is pushed into the barrel portion 2B-2 of the division part 2B in a state where the yoke 31 is positioned accurately and is positively prevented against rotation, and the outer peripheral portion of the yoke set 30 is fitted with the inner peripheral portion of the fit hold portion 2a formed in the interior of the division part 2B.

Here, according to the present embodiment, since there is employed a structure in which the engaging projections 33b integrally provided on the dust guard 33 are engaged with their associated peripheral-direction clearances respectively formed between the magnets 32 disposed within the yoke 31, the magnets 32 prevent the dust guard 33 from rotating in the peripheral direction, whereby the positioning and rotation prevention of the yoke 31 with respect to the cylindrical-shaped housing 2 by the engagement between the engaging recessed portion 33c-1 formed in the dust guard 33 functioning as a first engaging portion and the engaging projecting portion 2a-1 provided on the cylindrical housing 2 functioning as a second engaging portion can be attained further positively.

Also, because of the engagement of the engaging projections 33b of the dust guard 33 into the peripheral-direction clearances formed between the magnets 32, the axial-direction shift and peripheral-direction rotation of the magnets 32 can be prevented by the dust guard 33. And, since the engaging projections 33b are provided on the dust guard 33 integrally therewith, the number of parts can be reduced, the assembling efficiency of the power tool can be enhanced, and the cost of the power tool can be reduced.

After then, when the fan guide 8 of the motor assembly 50 is fitted with the inner peripheral portion of the barrel portion 2B-2 of the division part 2B, the fan guide 8 is prevented against rotation; and, as described above, since the fan guide 8 is contacted with the axial-direction one end face of the yoke 31 and the projecting portion 8a provided on the fan guide 8 is fitted with the recessed portion 31a formed in one end face of the yoke 31, the positioning and rotation prevention of the yoke 31 can be attained by the fan guide 8 as well, the angle positions of the magnets 32 mounted on the inner surface of the yoke 31 with respect to the carbon brush (see FIGS. 1 and 6) can be determined with high accuracy.

Also, because the two or more magnets 32 are fixed to the inner surface of the yoke 31, the yoke 31 is going to rotate on receiving the reacting torque of the magnetic force of the magnets used to rotate the armature 41 but, since the fan guide 8 and dust guard 33 prevent the yoke 31 against rotation, there is eliminated the possibility that the yoke 31 can be rotated on receiving the reacting torque of the magnetic force of the magnets 32.

And, when the motor assembly 50 is pushed into the barrel portion 2B-2 of the division part 2B until the end face a of the yoke 31 shown in FIG. 6 is butted against the end face b of the fit support portion 2a on the division part 2B side, the assembling of the motor assembly 50 into the division part 2B is completed, the bearing 6 is held by the bearing receiving portion 2b provided within the division part 2B, and the carbon brush 25 is contacted with the commutator 41a of the armature 41, thereby assembling the direct-current motor 3.

As described above, according to the assembling method of the invention, not only the positioning and rotation prevention of the yoke 31 can be positively achieved with high operation efficiency but also the assembling of the direct-current motor 3 into the cylindrical-shaped housing 2 can be accomplished easily with high operation efficiency.

Also, since the fan guide 8 is assembled in a state where it is contacted with the axial-direction one end face of the yoke 31, there is produced no axial-direction clearance between them, which can enhance the airtightness from the armature 41 to the cooling fan 7 and also can enhance the cooling efficiency of the direct-current motor 3 by the cooling fan 7.

In the above-mentioned embodiment, description has been given heretofore of the structure in which the dust guard 33 is provided on the axial-direction one end of the yoke 31; however, the invention can also apply to a power tool which does not include the dust guard 33.

The invention can also similarly apply to other arbitrary power tools than the rotary hammer drill, such as a driver drill, a saber saw or an impact tool using the direct-current motor as its drive source.

What is claimed is:

1. A power tool, comprising:
   a cylindrical-shaped yoke;
   magnets provided in an interior of the yoke;
   an armature disposed rotatably in the interior of the yoke;
   a cooling fan rotatably secured to the armature;
   a fan guide disposed on a periphery of the cooling fan;
   a cylindrical-shaped housing, structured by connecting a front division part and rear division part, having the yoke mounted in a barrel of the rear division part,
   wherein the fan guide contacts an axial-direction of one end face of the yoke and is engaged with the yoke in a rotational direction thereof, and
   wherein the fan guide has an outer shape following the inner peripheral shape of the barrel portion of the rear division part of the cylindrical-shape housing;
   rotation prevention means for preventing rotation of the yoke, said rotation prevention means being provided on an axial-direction of the other end face of the yoke; and
   a dust guard mounted on the yoke and projecting outwardly therefrom in an axial direction beyond the axial-direction of the other end face of the yoke, said dust guard being engaged with the yoke at the axial-direction of the other end face of the yoke, and
   wherein the rotation prevention means comprises:
   a first engaging portion formed on the dust guard and a second engaging portion formed in the cylindrical-shaped housing which engages with the first engaging portion in a rotational direction.

2. The power tool as set forth in claim 1, which further comprises:
   a recessed portion formed in the axial-direction one end face of the yoke and a projecting portion formed on the fan guide whereby the projecting portion is engaged with the recessed portion of the yoke.

3. The power tool as set forth in claim 1, which further comprises:
   two or more engaging projections which are engaged with a peripheral-direction clearance formed between the magnets provided within the yoke.

4. The power tool according to claim 1, wherein the dust guard is formed of resin.

5. The power tool as set forth in claim 1, wherein the fan guide is constructed such that an end face there of is contacted with an end face of the yoke existing on a rear side in an insertion direction, and the motor assembly is constructed to be able to push into the cylindrical-shaped cylinder through the fan guide.

* * * * *